United States Patent [19]
Morokawa

[11] Patent Number: 4,824,213
[45] Date of Patent: Apr. 25, 1989

[54] LIQUID CRYSTAL DISPLAY HAVING OPAQUE PORTIONS ON THE ELECTRODES

[75] Inventor: Shigeru Morokawa, Higashiyamato, Japan

[73] Assignee: Citizen Watch Co., Ltd., Tokyo, Japan

[21] Appl. No.: 681,589

[22] Filed: Dec. 14, 1984

[30] Foreign Application Priority Data

Dec. 16, 1983 [JP] Japan .............................. 58-193811[U]
Dec. 16, 1983 [JP] Japan .............................. 58-193812[U]
May 24, 1984 [JP] Japan ................................. 59-105587

[51] Int. Cl.⁴ .............................................. G02F 1/133
[52] U.S. Cl. ..................................... 350/336; 350/333
[58] Field of Search ................... 350/336, 334, 339 F, 350/346, 331 R, 333; 340/784

[56] References Cited

U.S. PATENT DOCUMENTS

| | | | |
|---|---|---|---|
| 3,840,695 | 10/1974 | Fischer ................................ | 350/334 |
| 3,978,580 | 9/1976 | Leupp .................................. | 350/344 |
| 4,012,122 | 3/1977 | McVeigh ........................ | 350/331 R |
| 4,158,484 | 6/1979 | Nishiyama ......................... | 350/338 |
| 4,231,640 | 11/1980 | Funada et al. ....................... | 350/336 |
| 4,359,729 | 11/1982 | Nonomura et al. ............ | 350/333 X |
| 4,386,352 | 5/1983 | Nonomura et al. ................. | 340/784 |
| 4,386,836 | 6/1983 | Aoki et al. ...................... | 350/346 X |
| 4,518,225 | 5/1985 | Fredrickson .................... | 350/339 F |
| 4,541,696 | 9/1985 | Clerc .................................. | 350/333 |
| 4,552,437 | 11/1985 | Gautenbrink ................... | 350/339 F |
| 4,560,999 | 12/1985 | Tokuhara ........................ | 350/345 X |
| 4,568,149 | 2/1982 | Sugata .......................... | 350/339 F |

OTHER PUBLICATIONS

Kmetz, "Matrix Addressing of Non-Emissive Displays", *Nonemissive Electrooptic Displays,* ed. Kmetz et al., pp. 261–289, published 1975.

Eiji Kaneko, "Liquid Crystal Matrix Displays", pp. 2–11, vol. 4 of Advances in Image Pickup and Display, by B. Kazan dated 1981.

*Primary Examiner*—Stanley D. Miller
*Assistant Examiner*—David Lewis
*Attorney, Agent, or Firm*—Birch, Stewart Kolasch & Birch

[57] ABSTRACT

Disclosed is a matrix type liquid crystal display device comprising a column-and-line arrangement of pixels and a grating pattern which masks the spaces between adjacent pixels, thereby improving the contrast of the whole matrix display.

10 Claims, 5 Drawing Sheets

LIQUID CRYSTAL DISPLAY HAVING OPAQUE PORTIONS ON THE ELECTRODES

BACKGROUND OF THE INVENTION

The present invention relates to a matrix type liquid crystal display device, and particularly to the structure of a matrix type liquid crystal display device which permits an image to appear at an improved contrast.

In a conventional matrix type liquid crystal display device a minimum voltage is applied to electrode elements of each picture element (pixel) in the matrix so as to avoid cross-talk between adjacent pixels, thereby assuring independency in driving selected pixels. An increase of the minimum voltage however causes the reduction of contrast. It is well known that the most appropriate driving condition, namely the maximum ratio "$\alpha$" of the maximum value of rms voltage "Von" to the minimum value of rms voltage "Voff", to be applied to a given pixel in an "n"-ratio matrix is given by:

$$\alpha = [(n^{\frac{1}{2}}+1)/(n^{\frac{1}{2}}-1)]^{\frac{1}{2}}.$$

If the ratio "$\gamma$" of the liquid crystal device is equal to or smaller than $\alpha[(\gamma/\alpha) \leq 1]$, where $\gamma = V_{SATLC}/V_{TLC}$ $V_{SATLC}$ represents the optical saturation voltage of the liquid crystal device, and $V_{TLC}$ represents the threshold voltage of the liquid crystal device, a voltage to be applied to a given pixel can be varied in the range from the threshold voltage $V_{TLC}$ to the saturation voltage $V_{SATLC}$, thus enabling the selection of applied voltage to a pixel most appropriately for increasing its contrast to a possible maximum.

If "n" increases, however, "$\alpha$" decreases to 1 accordingly, and as a result $(\gamma/\alpha) < 1$. Then, the contrast cannot be improved with recourse to the appropriate setting the applied voltage. Thus, the maximum improvement of contrast ratio is decided by the value of $(\gamma/\alpha)$ only. The description so far relates to the contrast of a pixel in the matrix.

As is well known, there are some different types of liquid crystal display device such as twisted nematic type liquid crystal and guest-host type liquid crystal. These liquid crystal display devices may be again classified in transparent and non-transparent types. The former liquid crystal display allows light to pass therethrough when not subjected to an electric field (commonly called "normally white"), whereas the latter liquid crystal prevents light from passing therethrough when not subjected to an electric field (commonly called "normally black"). No matter which type liquid crystal is used, production of liquid crystal display matrixes of the same contrast cannot be assured. This is attributable to the interspace between adjacent electrode elements of picture elements.

The contrast of the "normally white" liquid crystal matrix is described with reference to that of the "normally black" liquid crystal matrix.

FIGS. 1A, 1B and 1C show the electro-optical characteristics of a twisted nematic liquid crystal display matrix. Ordinates represent the average spatial intensity of light passing through the liquid crystal display matrix whereas abscissas represent the rms values of voltage applied to the liquid crystal display matrix. Specifically, FIG. 1A shows the electro-optical characteristics of a "normally white" liquid crystal display device. As shown, the light transmittance "Ls" starts decreasing when the voltage increases beyond the threshold voltage "$V_{TLC}$", and the light transmittance "Ls" decreases to the minimum "Lo" when the voltage increases beyond the saturation voltage "$V_{SATLC}$". This minimum represents the amount of light passing through the spaces between adjacent pixels in the matrix, and the minimum light transmittance Lo depends on the design and arrangement of transparent pixels. As a matter of course the value of the minimum light transmittance increases with an increase in the space between adjacent pixels in the matrx. The contrast of the liquid crystal display matrix cannot be raised above (Ls/Lo). Therefore, no matter how large a value of contrast, individual pixels may have, the contrast of the whole liquid crystal display matrix remains at a relatively low value.

FIG. 1B show an electro-optical characteristics of a "normally black" liquid crystal display device, which prevents light from passing therethrough when not subjected to an electric field. As shown, almost no light can pass through the liquid crystal display device when the applied voltage remains at a relatively low value. The light transmittance rises sharply when the applied voltage increases beyond "$V_{TLC}$", and a maximum amount of light (Ls-Lo) is allowed to pass through the liquid crystal display matrix when the applied voltage increases beyond "$V_{SATLC}$". The maximum light transmittance is equal to (Ls-Lo) rather than Ls. This is attributable to the fact that even if the pixels turn transparent, the spaces between adjacent pixels prevent light from passing therethrough, thus making the total amount of light passing through the whole area of the liquid crystal display matrix smaller than that of the "normally white" liquid crystal display matrix by the ratio of (Ls-Lo)/Ls. From the point of contrast, however, the amount of light at "black" level is so small that the contrast of the whole liquid crystal matrix is raised to a relatively high value. As is apparent from the above, the contrast of a liquid crystal display matrix is of as much concern as the contrast of individual electrode elements. The present invention aims at the reduction of adverse effect caused by the bias light passing through the spaces between adjacent pixels on the contrast of the whole liquid crystal display matrix.

The "normally black" twisted nematic type liquid crystal display matrix has a defect of browning tendency. If the matrix digit "n" is large enough to cause the ratio ($\alpha/\gamma$) to be smaller than one, the driving voltage to be applied to the liquid crystal matrix is selected around "$V_{TLC}$" with a view to obtaining a best possible contrast. As a consequence the drive voltage remains at a relatively low voltage, and accordingly the responsiveness is lowered. In contrast to this, the "normally white" liquid crystal display matrix of FIG. 1A require the drive voltage to be around $V_{SATLC}$ for its best contrast. $V_{SATLC}$ is higher in value than $V_{TLC}$ and accordingly the responsiveness is fairly good.

FIG. 1C shows electro-optical characteristics of a "normally white" liquid crystal matrix display whose pixel to pixel spaces are covered with a non-transparent material according to this invention. As a result the amount of light passing through the spaces between adjacent pixels reduces from Lo to Loo, and therefore the total light transparence of the liquid crystal matrix is reduced from Ls to (Ls−Lo+Loo). The amount of bias light at "black" level, however, reduces from Lo to Loo. Thus, the ratio of contrast (Ls−Lo+Loo)/Loo increases to the extent that it is fairly close to the contrast of a "normally black" liquid crystal matrix. Still advantageously for a relatively large value of "n", and hence for $\gamma/\alpha < 1$ the drive voltage to be applied to the liquid crystal matrix is around $V_{SATLC}$, and accordingly the responsiveness is much better than that in a "normally black" liquid crystal matrix.

SUMMARY OF THE INVENTION

One object of the present invention is to provide a liquid crystal display and especially a "normally white" liquid crystal display device which is capable of presenting images at an increased contrast without sacrificing the responsiveness inherent to the "normally white" liquid crystal display matrix.

Another object of the present invention is to provide a liquid crystal display device which is free from the trouble of accidental breakage of fine conductors extending on each transparent electrode strip because of dust.

Still another object of the present invention is to provide a liquid crystal display which is free from the necessity of increasing the resistance at terminals at which the transparent electrode strips are connected to exterior circuits, permitting the use of a mean metal in the terminals.

To attain these objects, a liquid crystal display device comprising a first transparent substrate bearing a plurality of transparent electrode columns, a second transparent substrate bearing a plurality of transparent electrode lines, and a liquid crystal sandwiched between said first and second transparent substrates, which face on each other with their electrode columns and lines orthogonal to each other, thus forming a plurality of electrode elements in the form of matrix, is modified according to the present invention by providing a grating pattern of masking to fill the spaces between adjacent electrode elements, thereby preventing light from passing through the spaces between them adjacent pixels in the matrix.

Also, according to the present invention, a liquid crystal display matrix further comprises a ladder-shaped conductor on each transparent electrode column and line, said conductor having an enlarged and aperture-made terminal for use in connecting said matrix to an outer circuit.

PREFERRED EMBODIMENTS OF THE INVENTION

As described earlier, a liquid crystal display matrix is modified according to the present invention by equipping the same with a grating pattern of masking to fill the spaces between adjacent pixels, thereby preventing light from passing through the interspaces in the matrix.

The interspaces may be blackened by applying a black dye to these interspaces on the front or back surface of the electrode transparencies. As a practical method of blackening the interspaces of the matrix, it is proposed that the transparent electrode columns and lines be partly blackened at regular intervals by applying metal films to transparencies specifically by vaporizing for sputtering chrome. Otherwise, the selected parts of the transparent electrode strips may be electroplated with nickel-phosphor.

Figure 1A:
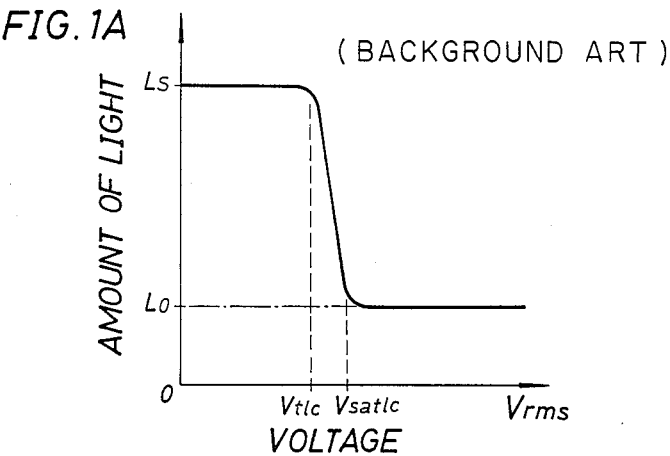
FIG. 1A shows the electro-optical characteristics of a twisted nematic type liquid crystal display matrix which is "normally white", permitting light to pass therethrough when not subjected to an electric field.
Figure 1B:
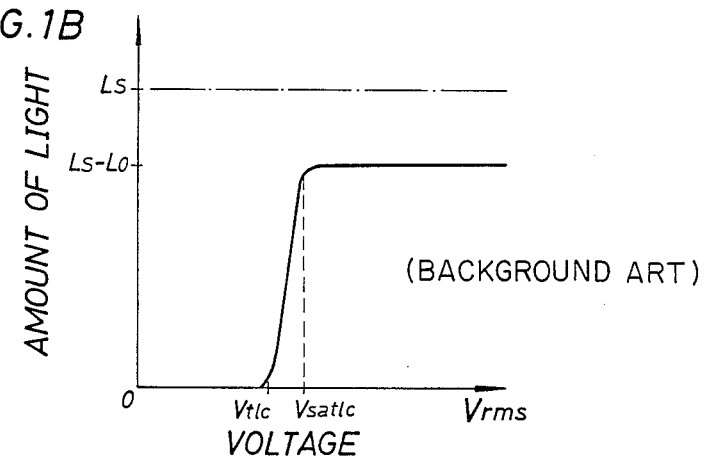
FIG. 1B shows the electro-optical characteristics of a twisted nematic type liquid crystal display matrix which is "normally black", preventing light from passing therethrough when not subjected an electric field.
Figure 1C:
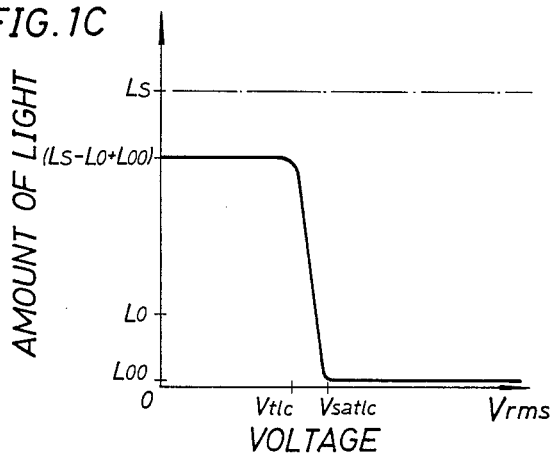
FIG. 1C shows an electro-optical characteristics of a twisted nematic type "normally white" liquid crystal display matrix whose interspaces between adjacent pixels are made non-transparent according to the present invention.
Figure 2A:
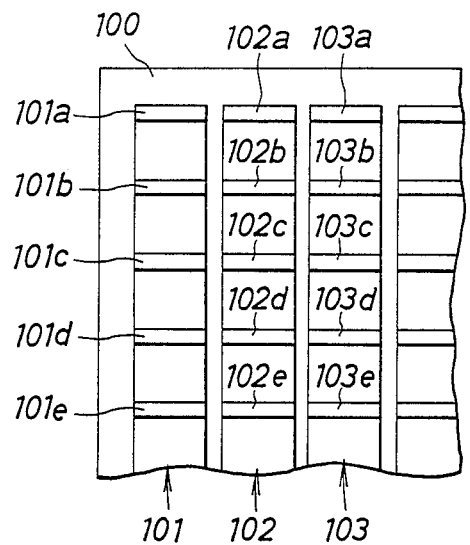
FIG. 2A is a plan view of a fragment of one of a pair of transparent electrodes to be used in a liquid crystal display matrix according to the present invention.
Figure 2B:
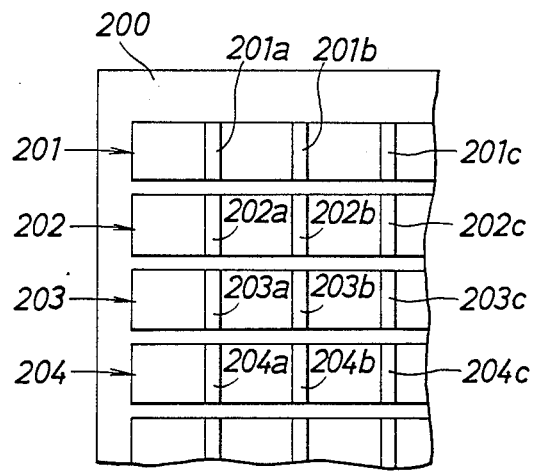
FIG. 2B is a plan view of a fragment of the other transparent electrode.
Figure 2C:
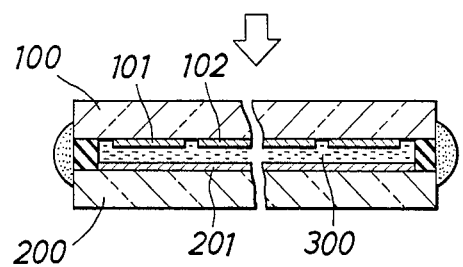
FIG. 2C is a cross-section of a liquid crystal display matrix according to the present invention.

FIG. 2A shows a fragment of one of a pair of transparent electrodes used in a liquid crystal display matrix whereas FIG. 2B shows a corresponding fragment of the other transparent electrode. FIG. 2C shows, in section, a liquid crystal display matrix having these transparent electrodes in a face-to-face relation. Specifically, as is best shown in FIG. 2C, a liquid crystal layer 300 is sandwiched in between opposite transparent substrate 100 and 200, which are made of a light-transparent, dielectric material, such as glass. As shown in FIG. 2A, a plurality of transparent electrode strips 101, 102, 103 . . . which are made of, for instance, a tin oxide, a titanium oxide, or an indium oxide, are formed on a transparent substrate 100. Masking film stripes or bars 101a-101e; 102a-102e; 103a-103e . . . are formed on the transparent electrode columns at regular intervals equal to the width of the transparent electrode lines 201, 202, 203 . . . of FIG. 2B. The masking film stripes are of, for instance, chromium, palladium or nickel. First, a masking pattern may be formed on the transparent electrode strips by photolithograph or masked evaporation, and then masking film stripes as required may be applied to transparent electrode strips by sputtering or electroplating, using the masking pattern.

Likewise, as shown in FIG. 2B, a plurality of transparent electrode strips 201, 202, 203, 204 . . . are formed on a transparent substrate 200. Masking film strips or bars 201a–201c; 202a–202c; 204a–204c . . . are formed on the transparent electrode strips 201–204 at regular intervals equal to the width of the transparent electrode strips 101, 102, 103 on the transparent substrate 100.

Figure 2D:
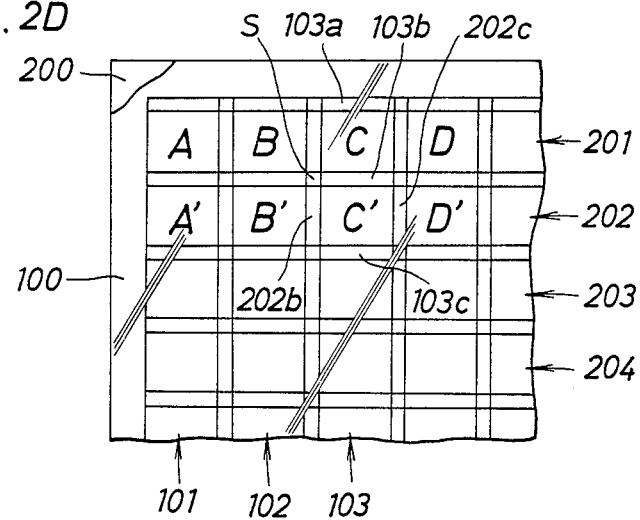
FIG. 2D is a plan view of a fragment of a liquid crystal display matrix composed of the transparent electrodes of FIGS. 2A and 2B facing each other with their transparent electrode columns and lines orthogonal to each other, and a liquid crystal sandwiched therebetween.

FIG. 2D is a plan view of the liquid crystal display matrix as viewed in the direction indicated by the arrow in FIG. 2C. The face-to-face areas of the opposite transparent strips 101–103 and 201–204 constitute electrode elements of pixels A, B, C, D . . . A', B', C', D' . . . Each pixel is surrounded by four masking stripes, as for instance, the pixel C' is surrounded by masking stripes 103b and 103c (upper and lower sides) and by masking stripes 202b and 202c (left and right sides). A very small square area "S" bounded by four adjacent pixels, for instance, those indicated by B, C, B' and C', however, is not covered by any means. In a conventional "normally white" liquid crystal display matrix the surrounding area of each pixel is not covered and therefore a substantial amount of light leaks from the whole area of the liquid crystal matrix. In a conventional "normally black" liquid crystal display matrix the surrounding area of each electrode element is blackened, with no light leaking from the whole area of the liquid crystal matrix.

As is readily understood from the above, a "normally white" liquid crystal matrix according to the present invention has as good a contrast as a "normally black" liquid crystal matrix, without deteriorating the quick responsiveness inherent to the "normally white" liquid crystal matrix.

Figure 2E:
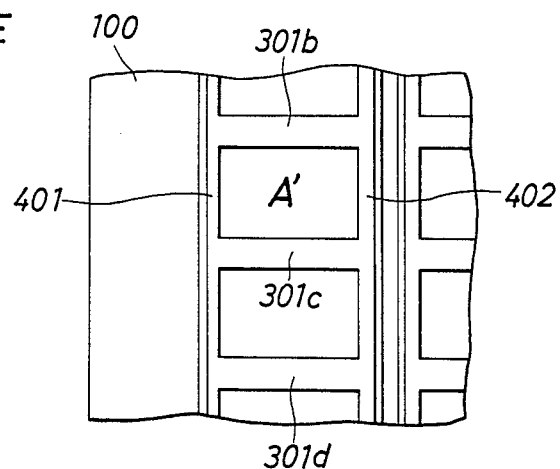
FIG. 2E is a plan view of a fragment of a transparent electrode with two conductor extensions laid on the opposite longitudinal edges of each transparent electrode strip according to the present invention.

FIG. 2E shows a modification of masking film applied onto a transparent substrate. As shown in the drawing, each transparent pixel A' is bounded by masking stripes 301b, 301c, 301d . . . (upper and lower sides) and by conductor stripes 401 and 402 (left and right sides).

The connection of masking stripes by means of conductor stripes is effective to compensate for the relatively low conductivity of the transparent electrode strip, and at the same time, effective to enable the masking effect to work in an expanded region. For instance, a 1000 Å-thick chromium film strip of an electrical conductivity ranging from 100Ω☐ to 1000Ω may be used if the chromium film strip is equipped with conductor extensions on the opposite sides of the strip. Also, thanks to the parallel arrangement of the two conductor extensions on the opposite sides of the film strip, even if one of these conductor extensions should be accidentally broken by dust or any other impurities in the course of the photolithograph process, the other conductor extension remains perfect, thus maintaining the resistance of the transparent electrode strip at a relatively low value.

The masking pattern may be formed on the transparent substrate prior to the formation of transparent electrode strips. Specifically, a chromium or nickel masking pattern may be formed on a glass substrate, and then transparent electrode stripes may be laid thereon. The masking pattern may be composed of a non-conductive film. For instance, a black dye may be applied to transparent electrode strips. Otherwise, an aperture-made sheet may be laid on an electroded transparence with its apertures in registration with the underlying electrode pattern or a substrate.

Figure 3A:
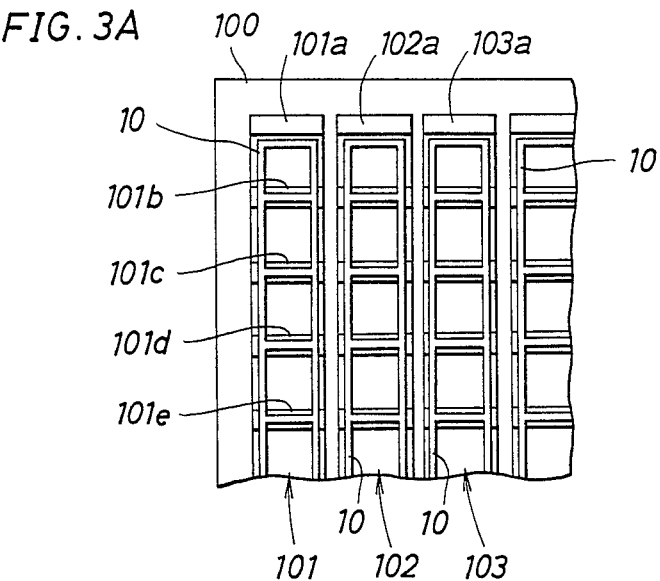
FIG. 3A is a plan view of a fragment of one of a pair of transparent electrode with a ladder-shaped conductor laid on each electrode column according to the present invention.
Figure 3B:
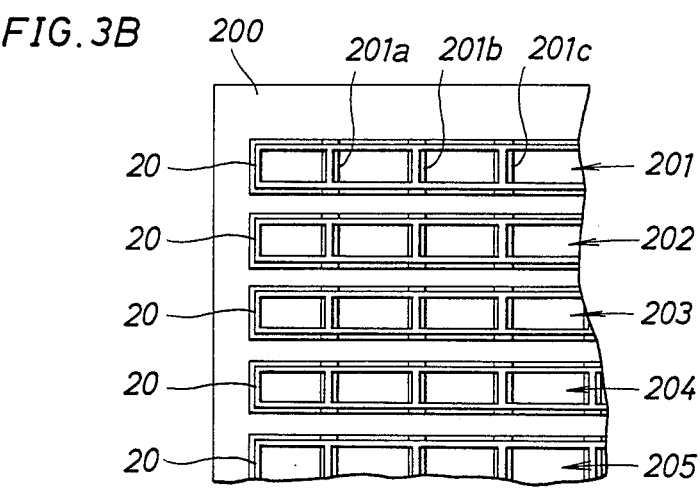
FIG. 3B is a plan view of the other transparent electrode which is formed in opposite relation to the transparent electrode of FIG. 3A.

FIGS. 3A and 3B show a pair of electrode transparencies which may be used in a liquid crystal display matrix according to this invention. In these drawings the same parts as appear in FIGS. 2A and 2B are indicated by the same reference numerals as used in FIGS. 2A and 2B. As shown in FIG. 3A, a ladder-shaped conductor 10 is formed on each transparent electrode strip 101, 102, 103, to improve the conductivity of the electrode strips. Ladder-shaped conductors may be formed by vaporizing or sputtering an appropriate metal on the electrode strips.

Likewise, similar ladder-shaped conductors 20 are formed on the transparent electrode strips 201–205 in the other transparent substrate 200. An electrode matrix may be formed by arranging these two electrode transparencies in opposite relationship with their parallel strips crossing to each other.

The effective display area of the liquid crystal matrix is guaranteed free of reduction by using a conductor extension no wider than half of the filler metal, and by putting such a fine metal wire in line with the filler metal provided on the rear striped transparency.

Figure 4:
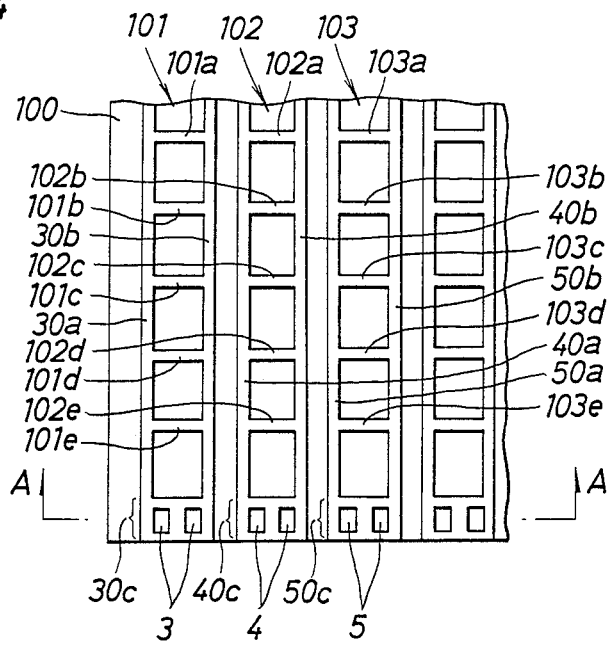
FIG. 4 is a plan view of a fragment of a transparent electrode of which each transparent electrode column has two conductor extensions ending with an enlarged and aperture-made thermal.
Figure 5:
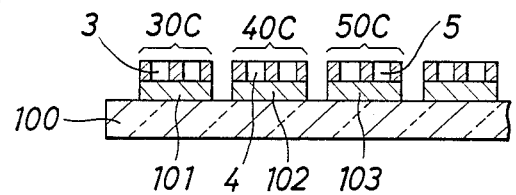
FIG. 5 is a sectional view taken along the line "A'-"—"A" of FIG. 4.
Figure 6:
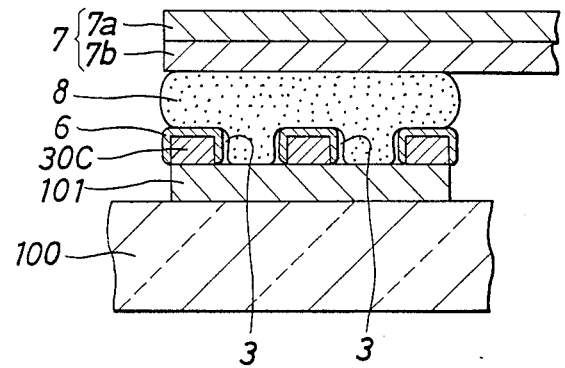
FIG. 6 is a sectional view of a part of a liquid crystal display matrix showing how a transparent electrode strip of FIG. 4 is connected to an outer circuit.

FIGS. 4 to 6 show a liquid crystal matrix according to still another embodiment of the present invention in which an electrical connection between the matrix-electroded transparency and an outer electric circuit is improved.

FIG. 4 shows particularly the terminal structure of the transparent electrode strip with an electrical connection being made between the electrode strip and an outer electric circuit. As shown in the drawing, a plurality of transparent electrode strips 101–103 are deposited on a transparent substrate 100, with each electrode strip 101, 102 or 103 having a plurality of latitude masking film stripes 101a–101e; 102a–102e; or 103a–103e at regular intervals and longitudinal conductor extensions 30a, 30b; 40a, 40b; 50a, 50b; which are made of nickel, chromium or an alloy thereof. Each pair of longitudinal conductor extensions has an expanded terminal as indicated by 30c, 40c or 50c for use in connecting an outer circuit. As shown, each expanded terminal has openings as indicated by 3, 4 or 5. FIG. 5 shows a cross-section taken along the line A—A in FIG. 4.

FIG. 6 shows how each transparent electrode strip 101, 102 and 103 is connected to an outer circuit. In the drawing, 6 indicates an undesired metal oxidation film; 7a an insulating substrate; 7b a mosaic-apertured conductor layer; 8 an electrically conductive, yieldingly deformable body such as a piece of rubber impregnated with pulverized metal, for instance, pulverized silver or gold-plated nickel particles.

As shown in FIG. 6, the electrically conductive rubber mixture 8 is partly deformed to invade the openings 3 of the enlarged terminal 30c of the transparent electrode strip 101, thus making an electrical connection between the transparent electrode strip 101 and the terminal end 7 of the outer circuit (not shown). Thus, the transparent electrode strip 101 and the terminal end 7 of an outer circuit are connected directly to each other, bypassing the surface layer of oxidization appearing on the terminal end of the conductor extension. Thanks to this unique mode of connection, a liquid crystal matrix is guaranteed to be free of increased resistance at the connection to an outer circuit. This increased resistance otherwise, would appear between the non-apertured terminal end of the conductor extension and the corresponding terminal end of the outer circuit.

It is to be understood that, although the invention has been described in connection with particular embodiments, the invention should not be limited thereto and can be subjected to various changes or modifications without departing from the spirit of the invention.

What is claimed is:

1. A "normally white" liquid crystal display device comprising:
    a first transparent substrate having a plurality of transparent electrode columns formed thereon;
    a second transparent substrate having a plurality of transparent electrode lines formed thereon; and
    a liquid crystal disposed between said first and second transparent substrates, said transparent electrode columns of said first transparent substrate facing said transparent electrode lines of said second transparent substrate, said electrode columns and said electrode lines being orthogonal to each other, thus forming a plurality of picture elements in the form of a matrix, wherein said transparent electrode columns are provided with a plurality of nonconnected horizontal conductive light shielding bars disposed at equal distances and said transparent electrode lines are provided with a plurality of nonconnected longitudinal conductive light shielding bars disposed at equal distances to mask the spaces between adjacent said picture elements in said matrix when said first and second transparent substrates are overlapped.

2. A "normally white" liquid crystal display device according to claim 1 wherein said horizontal and vertical light shielding bars are composed of a metal film.

3. A "normally white" liquid crystal display device according to claim 2 wherein said metal film is of chromium.

4. A "normally white" liquid crystal display device according to claim 2 wherein said metal film is of nickel phosphor.

5. A "normally white" liquid crystal display device according to claim 1 wherein each said transparent electrode column and line further comprises a ladder-shaped conductor having longitudinal conductive bars extending along opposite sides of each said transparent electrode column and line and cross-conductive bars connecting said longitudinal conductive bars.

6. A "normally white" liquid crystal display device according to claim 5 wherein opposite said longitudinal bars of said ladder-shaped conductor are formed on the opposite longitudinal edges of each said transparent electrode column on said first transparent substrate, and said cross bars of said ladder-shaped conductor are formed on each transparent electrode column in registration with each latitude space between adjacent transparent electrode lines on said second transparent substrate.

7. A "normally white" liquid crystal display device according to claim 1 wherein each said transparent electrode column has an enlarged and aperture-made terminal, and each said transparent electrode line has an enlarged and aperture-made terminal.

8. A "normally white" liquid crystal display device according to claim 7 wherein said enlarged and aperture-made terminal is composed of an electrically conductive metal oxide film.

9. A "normally white" liquid crystal display device according to claim 7 wherein said enlarged and aperture-made terminal is composed of nickel film.

10. A "normally white" liquid crystal display device according to claim 7 wherein said enlarged and aperture-made terminal is composed of chromium film.

* * * * *